(12) United States Patent
Patel

(10) Patent No.: US 8,586,119 B2
(45) Date of Patent: Nov. 19, 2013

(54) DISTRIBUTING PRODUCTS WHICH COMPRISE COCONUT WATER

(71) Applicant: Nilang Patel, Mableton, GA (US)

(72) Inventor: Nilang Patel, Mableton, GA (US)

( * ) Notice: Subject to any disclaimer, the term of this patent is extended or adjusted under 35 U.S.C. 154(b) by 0 days.

(21) Appl. No.: 13/715,444

(22) Filed: Dec. 14, 2012

(65) Prior Publication Data

US 2013/0156915 A1   Jun. 20, 2013

Related U.S. Application Data

(60) Provisional application No. 61/576,421, filed on Dec. 16, 2011.

(51) Int. Cl.
*A23L 2/42* (2006.01)
(52) U.S. Cl.
USPC ........................................ 426/489; 426/330.5
(58) Field of Classification Search
USPC .............................................. 426/489, 330.5
See application file for complete search history.

(56) References Cited

U.S. PATENT DOCUMENTS

| 2008/0178750 | A1 | 7/2008 | Rogers et al. |
| 2009/0291172 | A1* | 11/2009 | Saez ........................... 426/330.5 |
| 2013/0156914 | A1* | 6/2013 | Patel ............................ 426/489 |

OTHER PUBLICATIONS

English Translation for AT 501237 published Jul. 2006.*
Derwent Abstract for AT 501237 published Jul. 2006.*
Derwent Abstract for BR 200100521, published Jun. 19, 2001.*

* cited by examiner

*Primary Examiner* — Anthony Weier

(57) ABSTRACT

The present invention relates to a method of distributing products which include a coconut water, the method including: procuring a coconut water that has been extracted from a coconut in a manner that prevented oxygen from contacting the coconut water during extraction from the coconut; manufacturing a product that includes at least a portion of the coconut water; and distributing the product to consumers. Additional embodiments of the present invention include extracting the coconut water by way of injecting a gas into the coconut, placing the coconut in a chamber and removing oxygen from around the coconut, collecting and utilizing coconut water collected in a manner which minimizes carbon emissions impact, packaging the product in a package material which includes a barrier property that abates oxygen transfer, and extending the consumer benefit of the coconut water by distributing the product through a refrigerated supply chain.

17 Claims, 8 Drawing Sheets

DISTRIBUTING PRODUCTS WHICH COMPRISE COCONUT WATER

CROSS-REFERENCE TO RELATED APPLICATIONS

This application contains subject matter which is related to the subject matter of the following co-pending application. The below listed application is hereby incorporated herein by reference in its entirety:

This is a U.S. non-provisional application that claims the benefit of a U.S. provisional application Ser. No. 61/576,421, inventor Nilang Patel, entitled "COCONUT WATER HAVING SUPERIOR CONSUMER BENEFITS", filed Dec. 16, 2011.

TECHNICAL FIELD OF THE INVENTION

This invention relates to a method of distributing products which comprise a coconut water, and particularly to a method comprising: procuring a coconut water that has been extracted from a coconut in a manner that prevented oxygen in the air from contacting the coconut water during extraction from the coconut; manufacturing a product that includes at least a portion of the coconut water; and distributing the product to consumers.

BACKGROUND OF THE INVENTION

Before our invention prior art practices of extracting coconut water from a coconut, in the presence of air containing oxygen, unintentionally compromised the quality of the coconut water. In this regard, by allowing the coconut water to contact oxygen, in the air, chemical reactions, in the coconut water, are initiated. These reactions cause oxidation to rapidly degrade the coconut water flavor, color or clarity, nutritional or nutrient benefits, and or degrade or impact other attributes of the coconut water that are sensitive to oxidation reactions.

Another shortcoming of prior art practices can be that since oxygen degrades the attributes of coconut water so quickly, growers may often be left with hoping that consumers will be unaware that their harvesting and coconut water extraction practices can be harmful to the consumer benefits associated with the coconut water. In this regard, prior art coconut water extraction practices can often nullify many of the consumer benefits, of the coconut water, long before it reaches the consumer.

Another shortcoming of prior art practices can be that for those growers that make an attempt to maintain some consumer benefit value, in their coconut water, post-harvest, the growers are often forced to undertake costly measures. On such measure can be transporting the coconuts to a remote location far from the grove for processing. This measure can be an attempt to harvest the coconut water, exposing the water to oxygen during extraction, but then trying to use the coconut water quickly before oxidation degradation destroys all of the consumer benefit attributes. This is a very costly approach, as it can require the grower to transport the heavy weight of the coconut solid matter twice; once with the coconut water in the coconut for extraction and a second time transporting the empty coconut waste away from the processing location.

Another shortcoming of prior art practices can be that coconut water extracted, in the presence of oxygen, starts a degradation process that in large part limits the coconut water, if extracted locally, from being transported to foreign countries and arrive in a grove-fresh state. In this regard, by the time the extracted coconut water arrives in a foreign country it is likely that the oxygen has oxidized the coconut water, irreversible damaging the flavors, color or clarity, nutritional or nutrient benefit, and or damaging other attributes of the coconut water.

For these reasons and shortcomings as well as other reasons and shortcomings there is a long felt need that gives rise to the present invention.

SUMMARY OF THE INVENTION

Shortcomings of the prior art are overcome and additional advantages are provided through the provision of a method of distributing products which comprise a coconut water, the method comprising: procuring a coconut water that has been extracted from a coconut in a manner that prevented oxygen from contacting the coconut water during extraction from the coconut; manufacturing a product that includes at least a portion of the coconut water; and distributing the product to consumers.

Additional shortcomings of the prior art are overcome and additional advantages are provided through the provision of a method of distributing products which comprise a coconut water, the method comprising: procuring a coconut water that has been extracted from a coconut in a manner that prevented oxygen from contacting the coconut water during extraction from the coconut; blending at least a portion of the coconut water with ingredients to form a beverage product or a beauty care product; and distributing the beverage product or the beauty care product to consumers.

Additional shortcomings of the prior art are overcome and additional advantages are provided through the provision of a method of distributing products which comprise a coconut water, the method comprising: importing a product from a foreign country that includes at least a portion of a coconut water that has been extracted from a coconut in a manner that prevented oxygen from contacting the coconut water during extraction from the coconut; and distributing the product to consumers.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
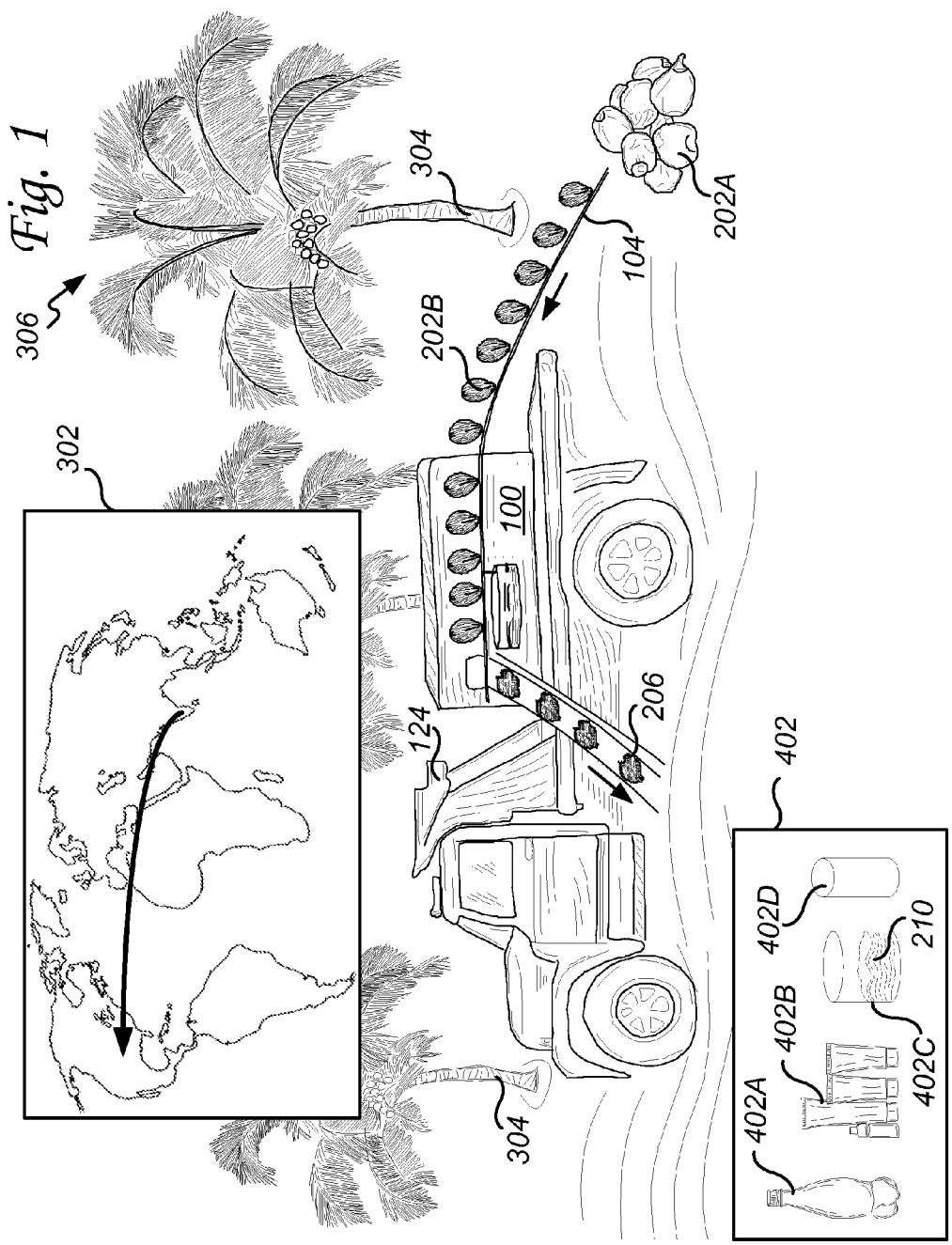
FIG. 1 illustrates one example of a system and method for preventing oxygen from contacting coconut water during extraction from a coconut.

Turning now to the drawings in greater detail, it will be seen that in FIG. 1 there is one example of a system and method for preventing oxygen in the air from contacting coconut water during extraction from a coconut. In an exemplary embodiment, the system 100 can be positioned in a processing facility or positioned on a mobile platform 124 proximate the coconut groves 306. For disclosure purposes such a mobile platform 124 can be a truck, trailer, or other mobile platform, as may be required and or desired in a particular embodiment. For purposes of disclosure coconut 202A-B can be referred to as coconut 202.

In this regard, coconuts 202A from coconut trees 304 can be harvested. The coconuts 202B can then be conveyed by conveyor 104 to the processing and extraction portion of system 100. The coconut 202B is processed and the coconut water is extracted, in a manner, which prevents oxygen in the air from contacting the coconut water during extraction from the coconut. The coconut is then macerated into a composting material 206 exiting the processing portion of the system 100.

With regards to the consumer benefits of coconut water, coconut water comprises organic compounds possessing healthy growth promoting properties that have been known to help keep the human body cool and at the proper temperature, orally re-hydrate the body, it is an all natural isotonic beverage, carries nutrients and oxygen to the cells, and naturally replenishes the body's fluids after exercising. In addition, other coconut water benefits can include raising the body's metabolism, promoting weight loss, boosting the body's immune system, detoxifying and fighting viruses, and cleansing the body's digestive tract. Furthermore, other coconut water benefits can include controlling diabetes, aiding the body in fighting viruses that cause the flu, herpes, and AIDS, balancing the body's PH and reducing the risk of cancer, treating kidney and urethral stones, and boosting poor circulation. Coconut water is also low in carbohydrates, 99% fat free, and low in sugar. In the presence of oxygen, oxidation of the coconut water begins degrading many of the consumer benefits mention above, as well as degrading other consumer benefits. Such oxidation degrades coconut water quickly. If the coconut water is not extracted and stored in an oxygen free manner and environment, the normal delay in reaching the consumer may mean that the consumer may never realize the benefits of consuming or using the coconut water based products.

An advantage in the present invention is that a system 100 mounted on a mobile platform 124 can extract the coconut water from coconuts proximate the coconut groves 306. In this regard, the coconuts 202 do not need to be transported to a remote processing facility. This eliminates the need to transport excess coconut solid mass weight such as the shell and other solid mass material, that will only be composted or otherwise discarded after coconut water is extracted. Eliminating the step of transporting the coconuts to a processing facility also eliminates the need for further transport of the waste coconut or composted material to yet another remote location. As such, the coconut water is utilized and collected in a manner which minimizes the carbon emissions impact associated with processing the coconut 202 by extracting the coconut water with a mobile processing system 100 locatable proximate the coconut groves 306 in lieu of transporting the coconut to a remote processing location, wherein transporting the coconut 202 can create wasteful carbon emissions not useful to the activity of extracting the coconut water.

Another advantage of the present invention is that the coconut water is extracted from the coconut in a manner which prevents oxygen in the air from contacting the coconut water during extraction from the coconut. In this regard, the environment inside the coconut prior to breech is oxygen free; prior art methods of cracking the coconut to get the coconut water out of the coconut exposes the coconut water to oxygen. As soon as oxygen contacts the coconut water certain chemical and oxidation reactions begin. These chemical and oxidation reactions very quickly degrade the flavor, color or clarity, nutritional or nutrient value, and or degrade or impact other attributes of the coconut water that are sensitive.

These reactions begin quickly and within the first 48 hours of exposure to oxygen much of the high quality benefits of flavor, color or clarity, nutritional or nutrient value, and other attributes of the coconut water can be degraded or impacted to the point the product quality is irreversibly damaged and can be perceived by the consumer in lacking at least freshness, nutritional benefit, and fortification. The present invention extracts coconut water in a manner which prevents oxygen from contacting the coconut water during extraction from the coconut. Furthermore, the extracted coconut water is stored in an oxygen free collection vessel. The system and method of the present invention prevents oxygen from contacting the coconut water during extraction and subsequent storage and as a result the flavor, color or clarity, nutritional or nutrient value, and or other attributes of the coconut water are preserved. This translates into delivering to the consumer a better product that has fresher taste with superior well protected consumer benefits, as compared to prior art coconut water extraction practices.

In an exemplary embodiment of the present invention, the present invention teaches a method of preventing oxygen from contacting a coconut water during extraction from a coconut, the method comprising: penetrating shell of a coconut with a probe, the probe further comprising a gas inlet and an egress port, the coconut further comprising a coconut water; injecting a gas under pressure into the coconut through the gas inlet; and allowing at least the gas pressure to effectuate the coconut water transfer, by way of the egress port, from the coconut to an oxygen free collection vessel.

Use of the term 'gas', 'inert gas', or 'noble gas', in the present invention, is intended to include any gas that does not chemically react with other substances, such as coconut water, except maybe under certain special conditions. As an example and not a limitation such gas, inert gas, and or noble gas as defined can include nitrogen, helium, neon, argon, krypton, xenon, radon, and other gases that do not chemically react with other substances, such as coconut water, except maybe under certain special conditions, as may be required and or desired in a particular embodiment. For disclosure purposes gas, inert gas, and noble gas can be referred to as gas. In addition, nitrogen is considered to be a mostly inert diatomic gas at standard conditions.

In another exemplary embodiment, the present invention teaches a method of preventing oxygen from contacting a coconut water during extraction from a coconut, the method comprising: enclosing the coconut in a chamber, the coconut further comprising a coconut water; removing the oxygen from around the coconut; penetrating shell of the coconut with an egress port; and transferring the coconut water by way of the egress port into an oxygen free collection vessel.

In another exemplary embodiment, the present invention teaches a method of preventing oxygen from contacting a coconut water during extraction from a coconut, the method comprising: inserting a gas inlet into a coconut, the coconut further comprising a coconut water; inserting an egress port into the coconut; injecting a gas under pressure into the coconut through the gas inlet; allowing at least the gas pressure to effectuate the coconut water transfer, by way of the egress port, from the coconut to an oxygen free collection vessel.

In another exemplary embodiment, the present invention teaches a system for preventing oxygen from contacting coconut water during extraction from a coconut, the system comprising: a gas inlet inserted into a coconut injects a gas under pressure into the coconut, the coconut further comprising a coconut water; an egress port inserted into the coconut allows the coconut water, displaced by at least the gas pressure, to egress the coconut; and an oxygen free collection vessel in communication with the egress port collects the coconut water.

In another exemplary embodiment, the present invention teaches a system for preventing oxygen from contacting coconut water during extraction from a coconut, the method comprising: a conveyor configured to transport a coconut to a coconut water extraction point, the coconut further comprising a coconut water; a chamber receives the coconut at the coconut water extraction point, a pump removes the oxygen from the chamber, creating an oxygen free environment around the coconut; and an egress port transfers the coconut water to an oxygen free collection vessel.

Other advantages of the present invention, in an exemplary embodiment, includes conveying the coconut to a coconut water extraction point, macerating the coconut to form a composting material, and using a gas such as nitrogen, or other inert and or noble gases, as the gas source, as may be required an or desired in a particular embodiment.

Other advantages of the present invention, in an exemplary embodiment, includes a probe penetrates the coconut, the probe further comprising the gas inlet and the egress port. Furthermore, the probe further comprising a cutting surface 120 illustrated in at least FIG. 3, effectuating easier insertion into the coconut, as may be required and or desired in a particular embodiment.

Since the present invention prevents oxygen in the air from contacting the coconut water during extraction and subsequent storage, which better preserves the flavor, color or clarity, nutritional or nutrient value, and or other attributes of the coconut water, this in part enables the present invention to utilize the system 100 to extract coconut water at the groves 306 instead of shipping coconuts to remote processing locations. Another advantage of the present invention is that since the coconut water is extracted and stored in an ideal oxygen free manner and environment, the coconut water can be shipped globally and still deliver superior consumer benefits of flavor, color or clarity, and nutritional or nutrient value, as well as other consumer benefits. As such, the present invention, in an exemplary embodiment, provides for a method of distributing products 402 which comprise coconut water.

A world map 302 illustrates how the present invention can be practiced throughout the world as a system and method for preventing oxygen from contacting the coconut water during extraction from a coconut. Furthermore, the world map 302 illustrates how, the novel system and method of extracting and storing the coconut water in an oxygen free manner and collection vessel better preserves the flavor, color or clarity, nutritional or nutrient benefits, and or other attributes of the coconut water; thus allowing groves 306 extracted coconut water to be distributed worldwide in a grove-fresh state. In this regard, the groves 306 harvested coconut water can be distributed worldwide in a grove-fresh state, faster, more efficiently, and at less cost, while retaining a superior flavor, color or clarity, nutritional or nutrient benefits, and or other attributes of the coconut water. Thus a distribution system and method can distribute the coconut water to foreign countries around the world; providing a worldwide source of superior quality coconut water having many consumer benefits.

In this regard, in an exemplary embodiment, the present invention teaches a method of distributing products 402 which comprise a coconut water, the method comprising: procuring coconut water that has been extracted from a coconut in a manner that prevented oxygen from contacting the coconut water during extraction from the coconut; manufacturing a product that includes at least a portion of the coconut water; and distributing the product to consumers.

In another exemplary embodiment, the present invention teaches a method of distributing products 402 which comprise a coconut water, the method comprising: procuring coconut water that has been extracted from a coconut in a manner that prevented oxygen from contacting the coconut water during extraction from the coconut; blending at least a portion of the coconut water with ingredients to form a beverage product 402A or a beauty care product 402B; and distributing the beverage product 402A or the beauty care product 402B to consumers. For disclosure purposes a beverage product 402A, beauty care product 402B, bulk shipping container product 402C comprising coconut water 210, and or other products 402D can be referred to as product 402.

In another exemplary embodiment, the present invention teaches a method of distributing products 402 which comprise a coconut water, the method comprising: importing a product from a foreign country that includes at least a portion of the coconut water that has been extracted from a coconut in a manner that prevented oxygen from contacting the coconut water during extraction from the coconut; and distributing the product to consumers.

Other advantages of the present invention, in an exemplary embodiment, includes extracting the coconut water by way of injecting an inert gas into the coconut, such that the inert gas pressure forces the coconut water to egress the coconut, by way of an egress port, into an oxygen free collection vessel.

Other advantages of the present invention, in an exemplary embodiment, includes placing the coconut in a chamber; removing the oxygen from the chamber, creating an oxygen free environment around the coconut; and transferring the coconut water through an egress port into the oxygen free collection vessel.

Other advantages of the present invention, in an exemplary embodiment, includes utilizing coconut water collected in a manner which minimizes carbon emissions impact associated with processing the coconut by extracting the coconut water with a mobile processing system locatable proximate the coconut groves 306 in lieu of transporting the coconut to a remote processing location, wherein transporting the coconut can create wasteful carbon emissions not useful to the activity of extracting the coconut water.

Other advantages of the present invention, in an exemplary embodiment, includes breeching the coconut shell to release the coconut water, and packaging the product 403 in a package material which comprises a barrier property that abates oxygen transfer from the external environment to the product 402.

Other advantages of the present invention, in an exemplary embodiment, include extending the consumer benefit of at least the coconut water 210 by distributing the product 402 through a refrigerated supply chain.

For disclosure purposes a product 402 can be a beverage product 402A, a beauty care product 402B, or other type or kind of product, as may be required and or desired in a particular embodiment.

Figure 2:
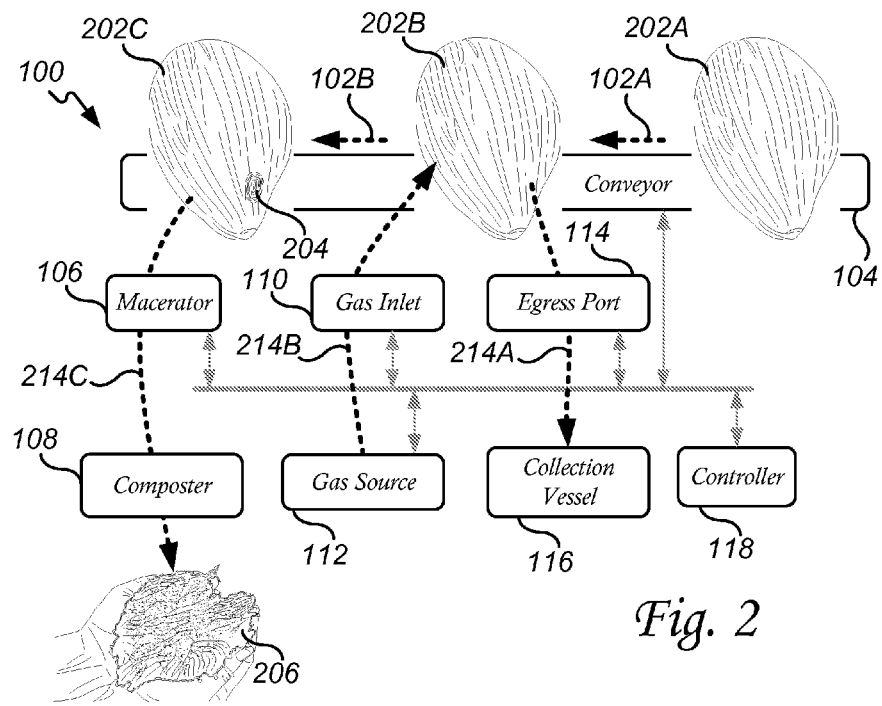
FIGS. 2, 3, and 4 illustrate examples of a system and method for preventing oxygen from contacting coconut water during extraction from a coconut.

Referring to FIG. 2 there is illustrated one example of a system 100 and method for preventing oxygen in the air from contacting coconut water 210 during extraction from a coconut. In an exemplary embodiment, a coconut 202A can be conveyed by a conveyor 104 to a coconut water extraction point 102A. An egress port 114 and a gas inlet 110 can be inserted or otherwise penetrate the coconut 202B shell to reach the coconut water 210 inside the coconut. The insertion of the egress port 114 and gas inlet 110 is done in a manner as not to allow oxygen to reach the coconut water 210. The egress port 114 is in communication with a collection vessel 116. The gas inlet 110 is in communication with a gas source 112. Such a gas source 112 can be an inert gas such as nitrogen, or other inert and or noble gas, as may be required and or desired in a particular embodiment. For purposes of disclosure coconut 202A-C can be referred to as coconut 202. In an exemplary embodiment, for example and not a limitation, conveyor 104 can be a linear track type conveyor, a rotary turn style type conveyor, and or other types and kinds of conveyors, as may be required and or desired in a particular embodiment.

In an exemplary embodiment, in operation, a pressurized gas is discharged into the coconut 202B. Pathway 214B better illustrates the gas injection portion of the method. The pressurized gas discharge into the coconut 202B in part causes the coconut water 210 to egress the coconut through the egress port 114 into the collection vessel 116. Pathway 214A better illustrates the coconut water 210 extraction through the egress port 114 portion of the method. Once the coconut water 210 has been extracted from the coconut 202B, the conveyor 104 conveys the coconut 202B to a maceration location 102B. Coconut 202C illustrates the penetration hole 204. The coconut 202C is then macerated by macerator 106 and turned into composting material 206 by composter 108. The composting material 206 exits the system 100. Pathway 214C better illustrates the maceration portion of the coconut water extraction method.

In an exemplary embodiment, a controller 118 is operationally related to the conveyor 104, egress port 114, gas inlet 110, gas source 112, macerator 106, and or other operational elements of the system 100, as may be required and or desired in a particular embodiment. For disclosure purposes, in an exemplary embodiment, a probe 122 can comprise the gas inlet 110 and the egress port 114. The probe 122 is illustrated in at least FIG. 3.

Figure 3:
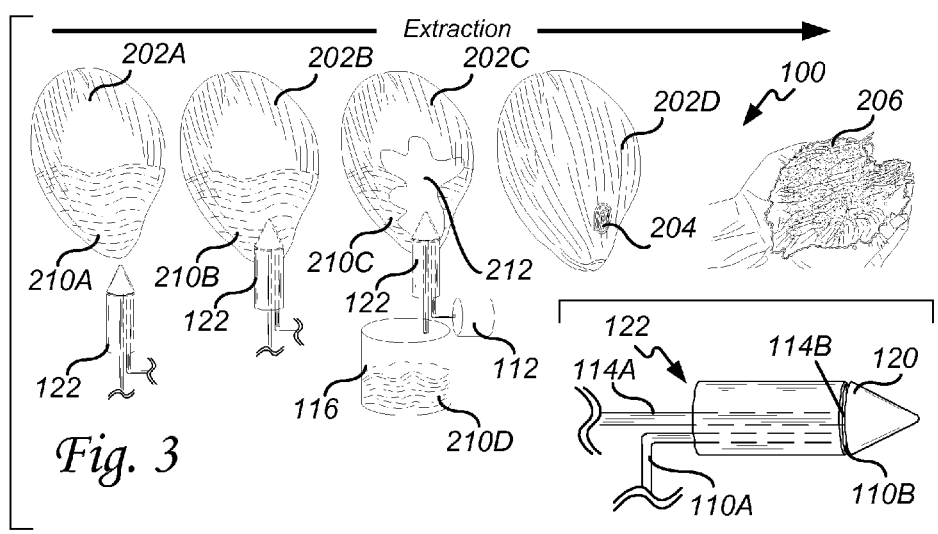

Referring to FIG. 3 there in illustrated one example of a system 100 and method for preventing oxygen from contacting coconut water 210 during extraction from a coconut 202. In an exemplary embodiment, FIG. 3 better illustrates the portion of the coconut water extraction method when the coconut is received at the coconut water extraction point referenced as 202B in FIG. 2. For purposes of disclosure coconut water 210A-D can be referred to as coconut water 210. Furthermore coconut 202A-D can be referred to as coconut 202; egress port 114A-B can be referred to as egress port 114, and gas inlet 110A-B can be referred to as gas inlet 110.

In this regard, the coconut 202A comprising coconut water 210A is received at the coconut water extraction point and is located proximate a probe 122. The probe 122 further comprising a gas inlet 110A, which is in communication with a gas source 112. In operation, pressurized gas is injected through the probe, by way of gas inlet 110A and exits the probe 122 at gas inlet 110B. The gas 212 is injected after the probe 122 has been inserted into the coconut 202C. Probe 122 further comprising an egress port 114A, which is in communication with the oxygen free collection vessel 116. In operation, when the pressurized gas is injected into the coconut 202C the coconut water 210C is forced into the egress port at location 114B and exits through the probe 122 at egress port point 114A into the oxygen free collection vessel 116. A cutting surface 120 can be affixed to the probe 122 effectuating the ability to more easily insert the probe 122 into the coconut 202.

Referring back to FIG. 3 when the coconut at position 202B comprising coconut water 210B is positioned and secured at the coconut water extraction point the probe 122 is inserted into the coconut 202B far enough to gain access to the coconut water 210B inside the coconut 202B. The probe can be engaged to penetrate the coconut shell by way of mechanical activation, pneumatic actuation, electrical activation, or by way of other activation, as may be required and or desired in a particular embodiment.

When the probe 122 is inserted into the coconut 202C comprising coconut water 210C, a pressurized gas 212 from a gas source 112 is injected into the coconut 202C through the probe 122 forcing the coconut water 210C out of the coconut 202C through the egress port 114 into the oxygen free collection vessel 116. The collection vessel 116 now stores the coconut water 210D. In an exemplary embodiment, the gas 212 can be an inert gas such as nitrogen or other type or kind of inert and or noble gases, as may be required and or desired in a particular embodiment.

After the coconut water 210 has been extracted from the coconut 202D a penetration hole 204 remains. The coconut 202D can then be macerated and composted into composting material 206.

Figure 4:
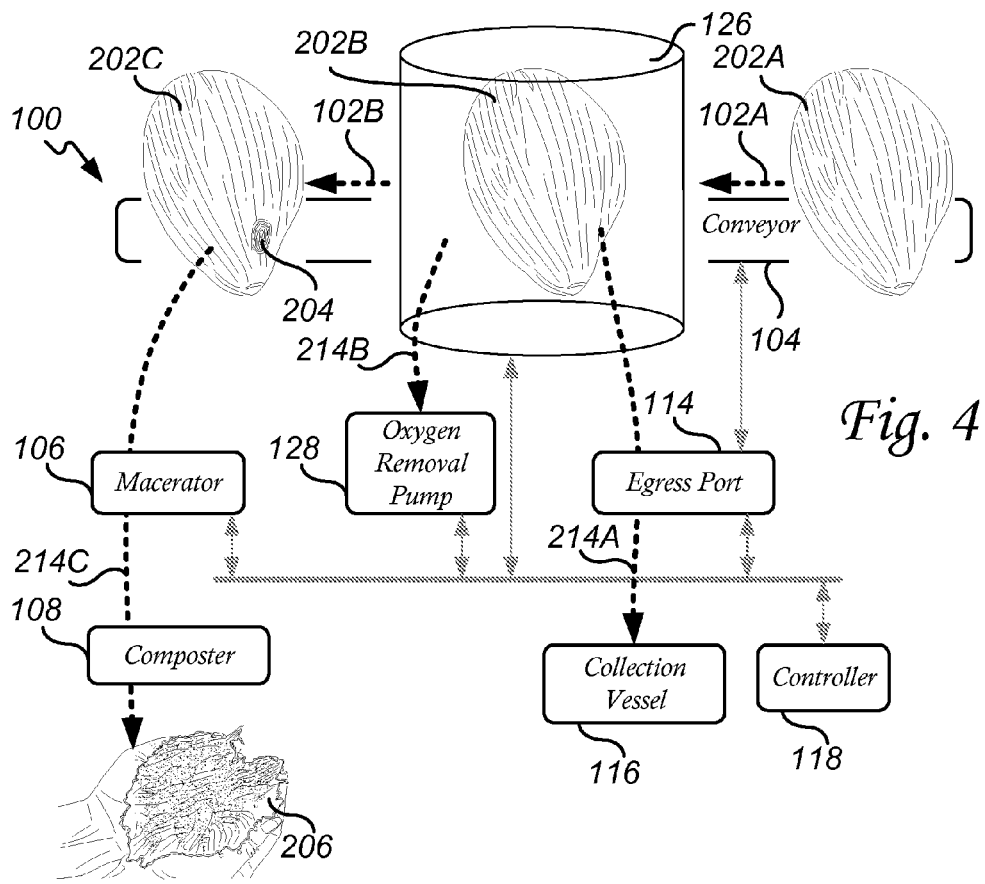

Referring to FIG. 4 there is illustrated one example of a system 100 and method for preventing oxygen in the air from contacting coconut water 210 during extraction from a coconut 202. In an exemplary embodiment, a coconut 202A is conveyed by conveyor 104 to a coconut water extraction point 102A. The coconut 202B is then enclosed in a chamber 126. The chamber 126 is evacuated by oxygen removal pump 128, which efficiently removes the air and thus the oxygen from around the coconut 202B. Pathway 214B illustrates the chamber 126 oxygen removal pump 128 portion of the coconut water extraction method. The coconut 202B shell is penetrated with an egress port 114. The coconut water is then transferred by way of the egress port 114 into an oxygen free collection vessel 116. Pathway 214A illustrates the coconut water extraction through the egress port portion of the method. Once the coconut water has been extracted from the coconut 202B, the conveyor 104 conveys the coconut 202B to a maceration location 102B. Coconut 202C illustrating the penetration hole 204 is then macerated by macerator 106 and turned into composting material 206 by way of composter 108. The composting material 206 exits the system 100. Pathway 214C better illustrates the maceration portion of the coconut water extraction method. In an exemplary embodiment, for example and not a limitation, conveyor 104 can be a linear track type conveyor, a rotary turn style type conveyor, and or other types and kinds of conveyors, as may be required and or desired in a particular embodiment.

In an exemplary embodiment, a controller 118 is operationally related to the conveyor 104, egress port 114, oxygen removal pump 128, macerator 106, and or other operational elements of the system 100, as may be required and or desired in a particular embodiment. For disclosure purposes coconut 202A-C can be referred to as coconut 202.

Figure 5:
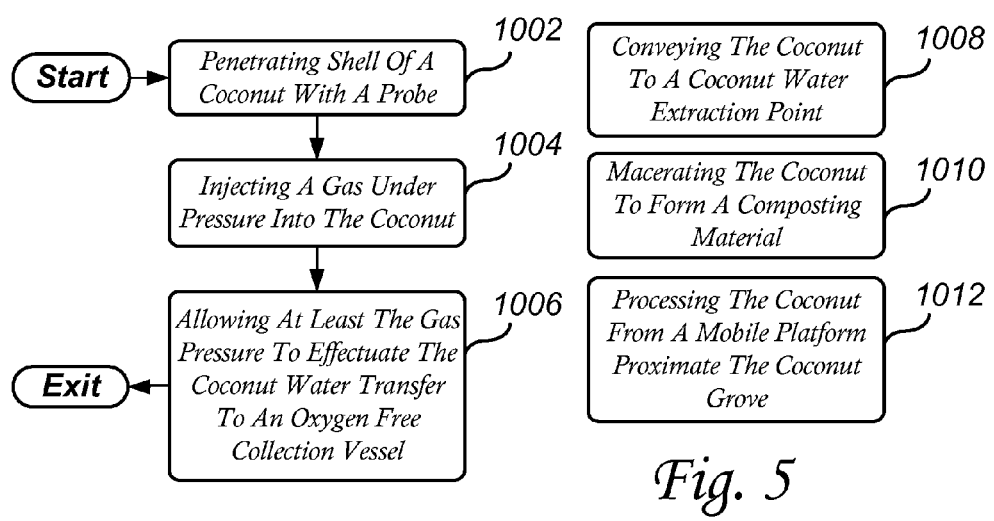
FIGS. 5, 6, and 7 illustrate examples of a method of preventing oxygen from contacting the coconut water during extraction from a coconut.

Referring to FIG. 5 there is illustrated one example of a method of preventing oxygen in the air from contacting the coconut water 210 during extraction from a coconut 202. In an exemplary embodiment, a probe 122 can be inserted into a coconut 202 and a pressurized gas 212 injected into the coconut 202. The gas 212 forces the coconut water 210 out of the coconut 202 and into a collection vessel 116. The gas 212 is preferable an inert gas. The collection vessel 116 is an oxygen free collection vessel.

In this regard, in an exemplary embodiment, the present invention teaches a method of preventing oxygen from contacting coconut water 210 during extraction from a coconut 202, the method comprising: penetrating shell of a coconut 202 with a probe 122, the probe 122 further comprising a gas inlet 110 and an egress port 114, the coconut 202 further comprising a coconut water 210; injecting a gas 212 under pressure into the coconut 202 through the gas inlet 110; and allowing at least the gas 212 pressure to effectuate the coconut water 210 transfer, by way of the egress port 114, from the coconut 202 to an oxygen free collection vessel 116. The method begins in block 1002.

In block 1002 a coconut 202 shell is penetrated with a probe 122. The method moves to block 1004.

In block 1004 a gas 212 under pressure is injected into the coconut 202. The method moves to block 1006.

In block 1006 at least the gas 212 pressure is allowed to effectuate the coconut water 210 transfer to an oxygen free collection vessel 116. The method is the exited.

Referring to FIG. 5 there is illustrated examples of exemplary embodiments of a method of preventing oxygen in the air from contacting coconut water 210 during extraction from a coconut 202. Such exemplary embodiments can be selectively utilized with the methods of the present invention.

In block 1008 the coconut 202 can be conveyed to a coconut water extraction point.

In block 1010 the coconut can be macerated to form a composting material 206.

In block 1012 the coconut 202 can be processed from a mobile platform 124 proximate the coconut 202 grove 306.

Figure 6:
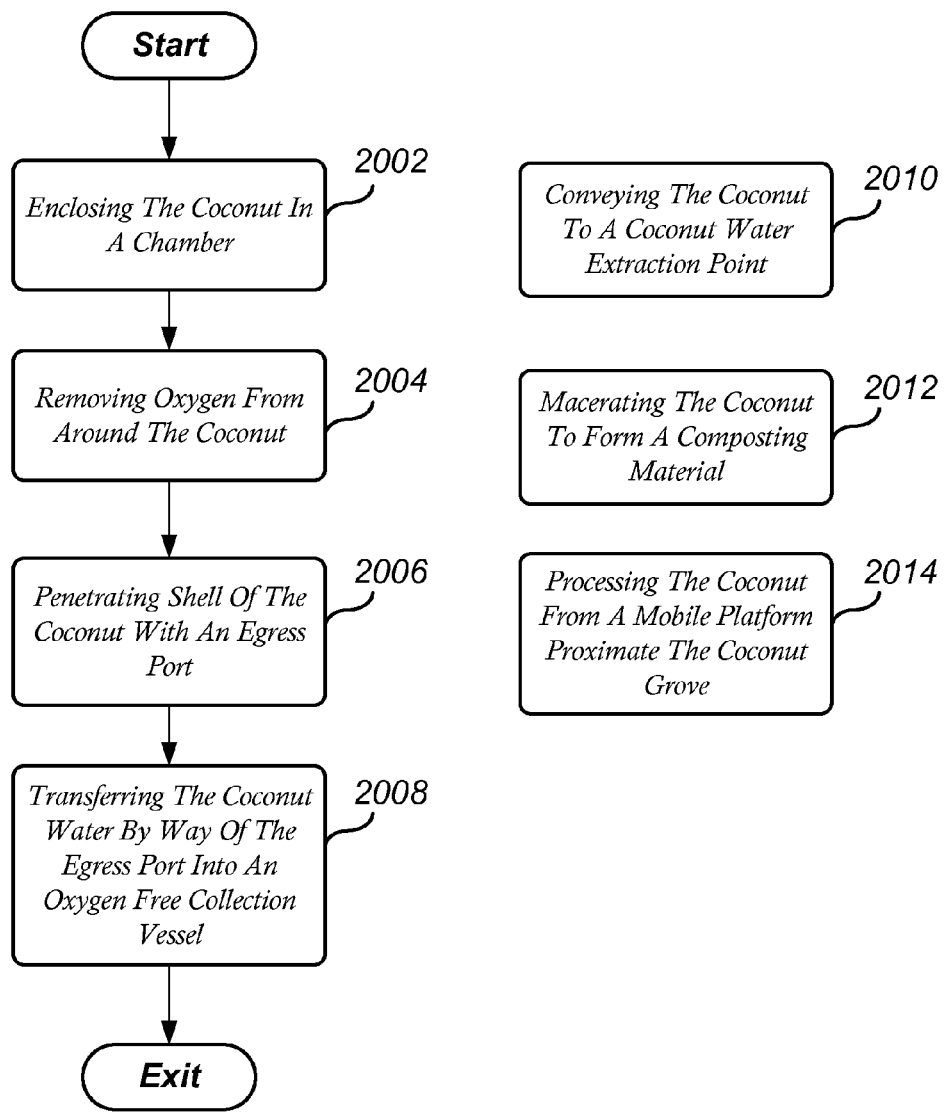

Referring to FIG. 6 there is illustrated one example of a method of preventing oxygen from contacting coconut water 210 during extraction from a coconut 202. In an exemplary embodiment, a coconut 202 is enclosed in a chamber 126. The chamber 126 is evacuated by oxygen removal pump 128, which efficiently removes the air and thus the oxygen from around the coconut 202. The coconut 202 shell is penetrated with an egress port 114 and the coconut water 210 is then transferred by way of the egress port 114 into an oxygen free collection vessel 116.

In an exemplary embodiment, the present invention teaches a method of preventing oxygen from contacting coconut water 210 during extraction from a coconut 202, the method comprising: enclosing the coconut 202 in a chamber 126, the coconut 202 further comprising a coconut water 210; removing the air and thus the oxygen from around the coconut 202; penetrating shell of the coconut 202 with an egress port 114; and transferring the coconut water 210 by way of the egress port 114 into an oxygen free collection vessel 116. The method begins in block 2002.

In block 2002 the coconut is enclosed in a chamber 126. The method continues in block 2004.

In block 2004 air and thus the oxygen is removed from around the coconut 202 by evacuating the chamber 126. The method continues in block 2006.

In block 2006 the shell of the coconut 202 is penetrated with an egress port 114. The method continues in block 2008.

In block 2008 the coconut water 210 is transferred by way of the egress port 114 into an oxygen free collection vessel 116. The method is the exited.

Referring to FIG. 6 there is illustrated examples of exemplary embodiments of a method of preventing oxygen from contacting coconut water 210 during extraction from a coconut 202. Such exemplary embodiments can be selectively utilized with the methods of the present invention.

In block 2010 the coconut 202 can be conveyed to a coconut water extraction point.

In block 2012 the coconut can be macerated to form a composting material.

In block 2014 the coconut 202 can be processed from a mobile platform 124 proximate the coconut 202 grove 306.

Figure 7:
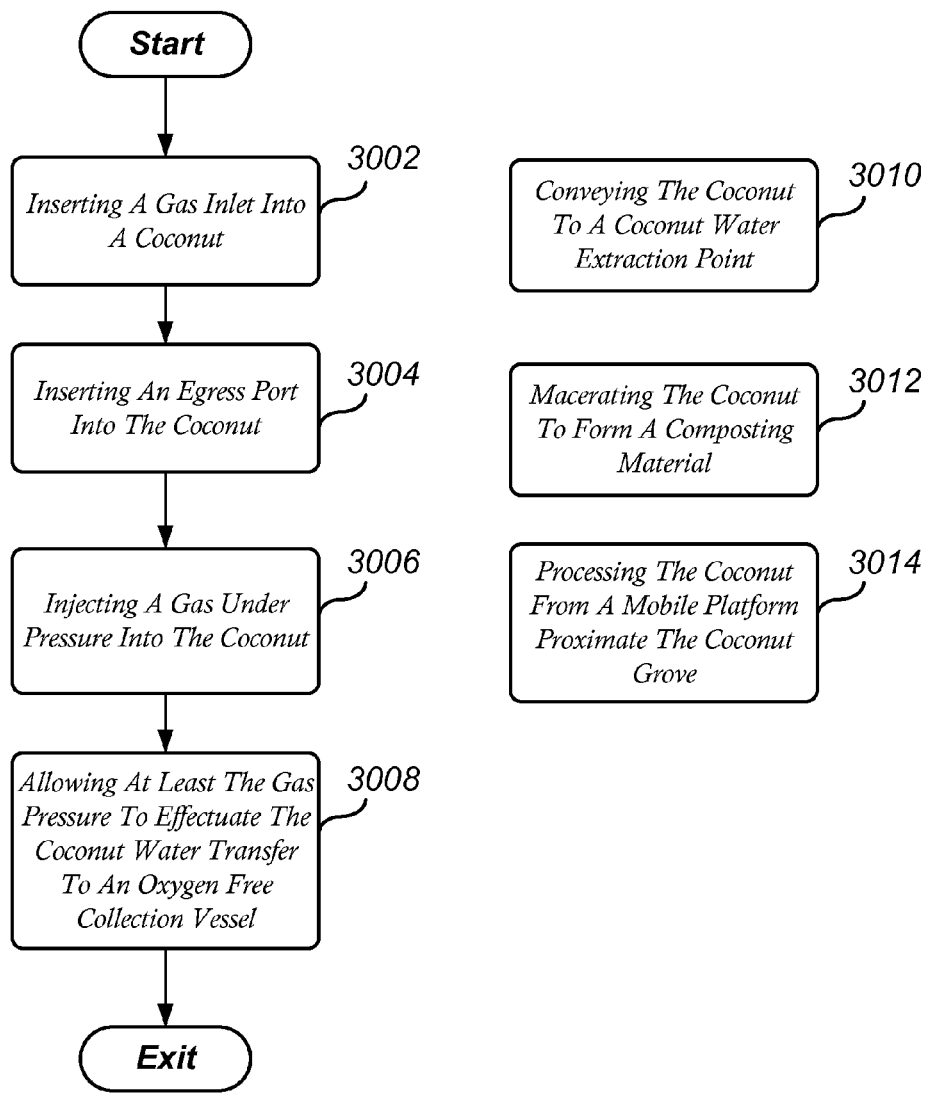

Referring to FIG. 7 there is illustrated one example of a method of preventing oxygen in the air from contacting coconut water 210 during extraction from a coconut 202. In an exemplary embodiment, a coconut 202 can be conveyed by a conveyor 104 to a coconut water extraction point. An egress port 114 and a gas inlet 110 can be inserted or otherwise penetrate the coconut 202 shell to reach the coconut water 210 inside the coconut 202. The insertion of the egress port 114 and gas inlet 110 is done in a manner as not to allow oxygen to reach the coconut water 210. The egress port 114 is in communication with a collection vessel 116. The gas inlet 110 is in communication with a gas source 112. Such a gas source 112 can be an inert gas 212 such as nitrogen, or other inert and or noble gases, as may be required and or desired in a particular embodiment.

In an exemplary embodiment, in operation, a pressurized gas 212 is discharged into the coconut 202. The pressurized gas 212 discharged into the coconut 202 causes the coconut water 210 to egress the coconut 202 through the egress port 114 into the collection vessel 116. Once the coconut water 210 has been extracted from the coconut 202, the coconut 202 is then macerated by macerator 106 and turned into composting material 206 by way of composter 108. The composting material 206 exits the system 100.

In an exemplary embodiment, a controller 118 is operationally related to the conveyor 104, egress port 114, gas inlet 110, gas source 112, macerator 106, and or other operational elements of the system 100, as may be required and or desired in a particular embodiment. For disclosure purposes, in an exemplary embodiment, a probe 122 can comprise the gas inlet 110 and the egress port 114. The probe 122 is illustrated in at least FIG. 3.

In an exemplary embodiment, the present invention teaches a method of preventing oxygen from contacting coconut water 210 during extraction from a coconut 202, the method comprising: inserting a gas inlet 110 into a coconut 202, the coconut 202 further comprising a coconut water 212; inserting an egress port 114 into the coconut 202; injecting an inert gas 212 under pressure into the coconut 202 through the gas inlet 110; allowing at least the gas 212 pressure to effectuate the coconut water 212 transfer, by way of the egress port 114, from the coconut 202 to an oxygen free collection vessel 116. The method begins in block 3002.

In block 3002 a gas inlet 110 is inserted into the coconut 202. The method continues in block 3004.

In block 3004 an egress port 114 is inserted into the coconut. The method continues in block 3006.

In block 3006 an inert gas 212 under pressure is injected into the coconut 202. The method continues in block 3008.

In block 3008 at least the gas 212 is allowed to effectuate the coconut water 210 transfer from the coconut 202 to an oxygen free collection vessel 116 by way of the egress port 114. The method is the exited.

Referring to FIG. 7 there is illustrated examples of exemplary embodiments of a method of preventing oxygen in the air from contacting coconut water 210 during extraction from a coconut 202. Such exemplary embodiments can be selectively utilized with the methods of the present invention.

In block 3010 the coconut 202 can be conveyed to a coconut water extraction point.

In block 3012 the coconut 202 can be macerated to form a composting material 206.

In block 3014 the coconut 202 can be processed from a mobile platform 124 proximate the coconut 202 grove 306.

Figure 8:
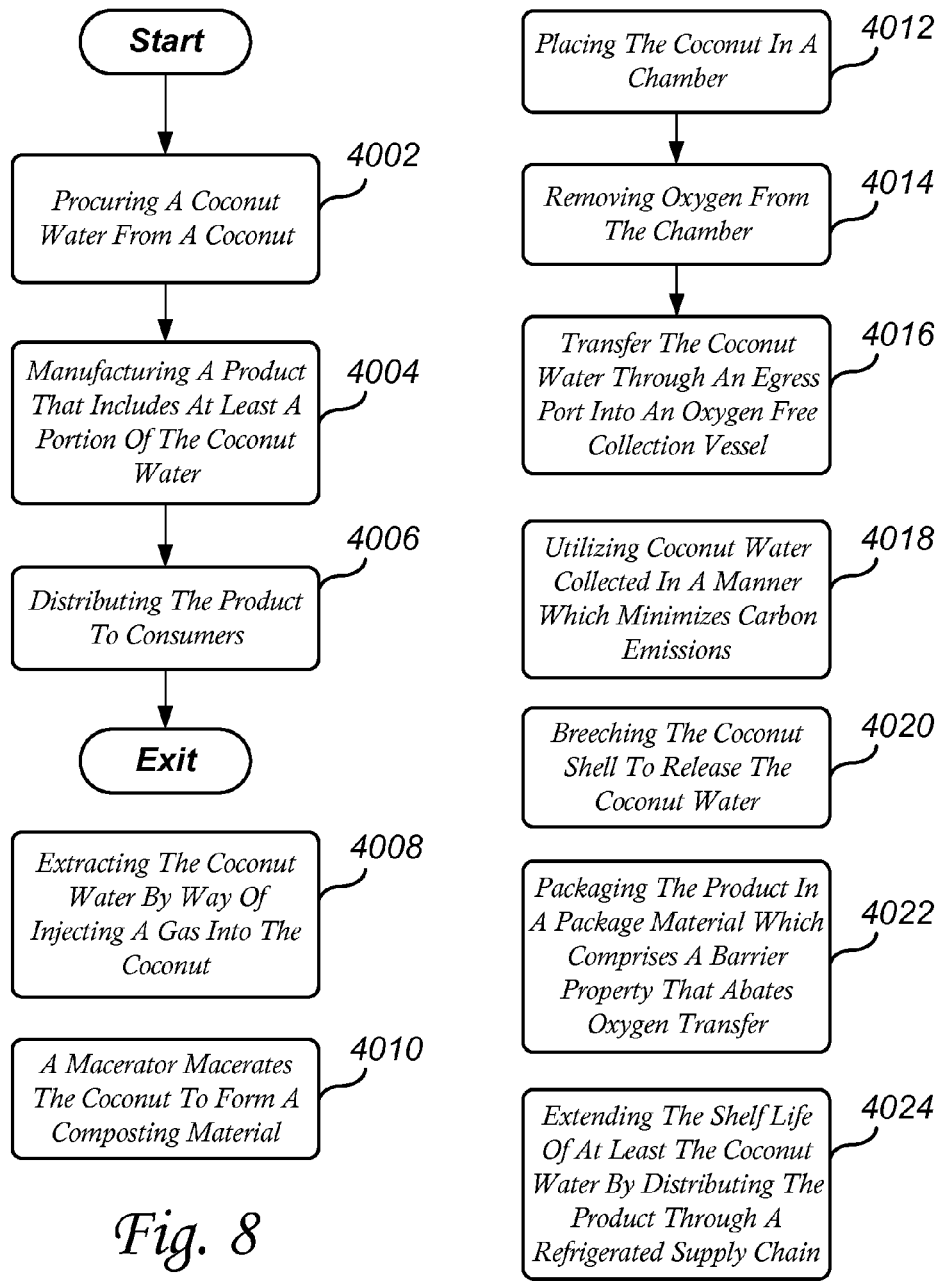
FIGS. 8, 9, and 10 illustrate examples of a method of distributing products which comprise coconut water.

Referring to FIG. 8 there is illustrated one example of a method of distributing products 402 which comprise coconut water 210. Since the present invention prevents oxygen in the air from contacting the coconut water 210 during extraction and subsequent storage, which better preserves the flavor, color or clarity, nutritional or nutrient value, and or other attributes of the coconut water 210, this in part enables the present invention to utilize the system 100 to extract coconut water 210 at the grove 306 instead of shipping coconuts 202 to remote processing locations. Another advantage of the present invention is that since the coconut water 210 is extracted and stored in an ideal oxygen free manner and environment the coconut water 210 can be shipped globally and delivering superior consumer benefits of flavor, color or clarity, and nutritional or nutrient value, as well as other consumer benefits. As such, the present invention, in an exemplary embodiment, provides for a method of distributing products 402 which comprises coconut water 210. For disclosure purposes a beverage product 402A, beauty care product 402B, bulk shipping container product 402C comprising coconut water 210, and or other products 402D can be referred to as product 402.

A world map 302 illustrates how the present invention can be practiced throughout the world as a system and method for preventing oxygen from contacting the coconut water 210 during extraction from a coconut 202. Furthermore, the world map 302 illustrates how, the novel system and method of extracting and storing the coconut water 210 in an oxygen free manner and collection vessel 116 better preserves the flavor, color or clarity, nutritional or nutrient benefits, and or other attributes of the coconut water 210; thus allowing groves 306 extracted coconut water 210 to be distributed worldwide in a grove-fresh state. In this regard, the groves 306 harvested coconut water 210 can be distributed worldwide in a grove-fresh state, faster, more efficiently, and at less cost, while retaining a superior flavor, color or clarity, nutritional or nutrient benefits, and or other attributes of the coconut water 210. Thus a distribution system and method can distribute the coconut water 210 to foreign countries around the world; providing a worldwide source of superior quality coconut water 210 having many consumer benefits.

In an exemplary embodiment, the present invention teaches a method of distributing products 402 which comprises a coconut water 210, the method comprising: procuring coconut water 210 that has been extracted from a coconut 202 in a manner that prevented oxygen from contacting the coconut water 210 during extraction from the coconut 202; manufacturing a product that includes at least a portion of the coconut water 210; and distributing the product to consumers. The method begins in block 4002.

In block 4002 coconut water 210 is procured. The method moves to block 4004.

In block 4004 a product is manufactured that includes at least a portion of the coconut water 210. In an exemplary embodiment, a product can be a beverage product 402A, a beauty care product 402B, or other type or kind of product 402, as may be required and or desired in a particular embodiment. The method moves to block 4006.

In block 4006 the product 402 is distributed to consumers. The method is exited.

Referring to FIG. 8 there is illustrated examples of exemplary embodiments of a method of distributing products 402 which comprise coconut water 210. Such exemplary embodiments can be selectively utilized with the methods of the present invention.

In block 4008 the coconut water 210 is extracted by way of injecting an inert gas 212 into the coconut 202.

In block 4010 a macerator 106 macerates the coconut 202 to form a composting material 206.

In block 4012 the coconut 202 is placed in a chamber 126. The method moves to block 4014.

In block 4014 air and thus the oxygen is removed or evacuated from the chamber 126. The method moves to block 4016.

In block 4016 the coconut water 210 is transferred through an egress port 114 into an oxygen free collection vessel 116.

In block 4018 the coconut water 210 is collected and utilized in a manner which minimizes carbon emissions.

In bock 4020 the coconut 202 shell is breeched to release the coconut water 212.

In block 4022 the product 402 is packaged in packaging material which comprises a barrier property that abates oxygen transfer. In an exemplary embodiment such packaging material can be aluminum, glass, treated polyethylene terephthalate (PET) plastic, coated paper packaging, or other packaging material, as may be required and or desired in a particular embodiment.

In block 4024 the shelf life of at least the coconut water 210 is extended by distributing the product 402 through a refrigerated supply chain.

Figure 9:
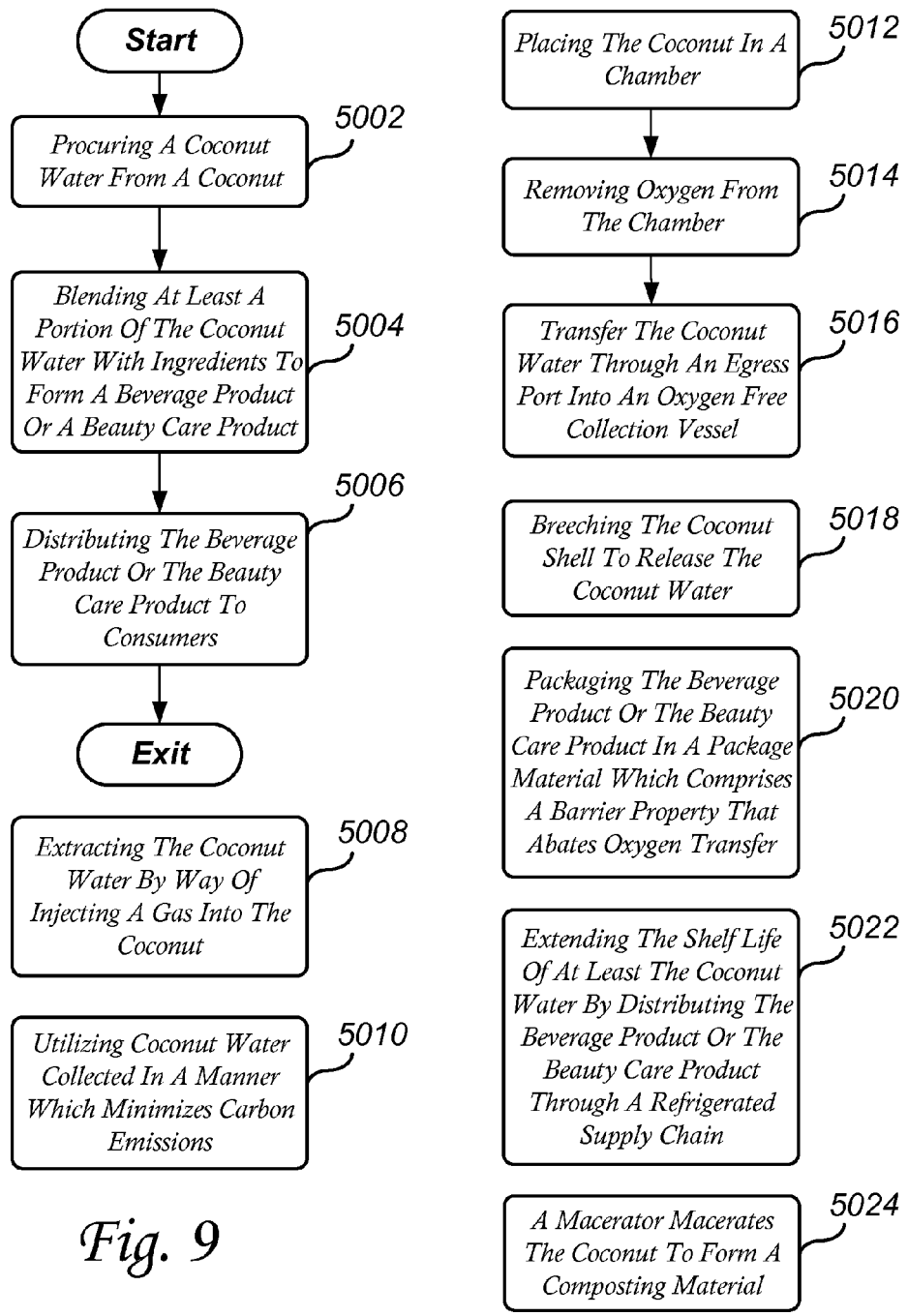

Referring to FIG. 9 there is illustrated one example of a method of distributing products 402 which comprise coconut water 210. Since the present invention prevents oxygen from contacting the coconut water 210 during extraction and subsequent storage, which better preserves the flavor, color or clarity, nutritional or nutrient value, and or other attributes of the coconut water 210, this in part enables the present invention to utilize the system 100 to extract coconut water 210 at the grove 306 instead of shipping coconuts 202 to remote processing locations. Another advantage of the present invention is that since the coconut water 210 is extracted and stored in an ideal oxygen free manner and environment the coconut water 210 can be shipped globally and delivering superior consumer benefits of flavor, color or clarity, and nutritional or nutrient value, as well as other consumer benefits. As such, the present invention, in an exemplary embodiment, provides for a method of distributing products 402 which comprises coconut water 210.

A world map 302 illustrates how the present invention can be practiced throughout the world as a system and method for preventing oxygen from contacting the coconut water 210 during extraction from a coconut 202. Furthermore, the world map 302 illustrates how, the novel system and method of extracting and storing the coconut water 210 in an oxygen free manner and collection vessel better preserves the flavor, color or clarity, nutritional or nutrient benefits, and or other attributes of the coconut water 210; thus allowing groves 306 extracted coconut water 210 to be distributed worldwide in a grove-fresh state. In this regard, the groves 306 harvested coconut water 210 can be distributed worldwide in a grove-fresh state, faster, more efficiently, and at less cost, while retaining a superior flavor, color or clarity, nutritional or nutrient benefits, and or other attributes of the coconut water 210. Thus a distribution system and method can distribute the coconut water 210 to foreign countries around the world; providing a worldwide source of superior quality coconut water 210 having many consumer benefits.

In another exemplary embodiment, the present invention teaches a method of distributing products 402 which comprises a coconut water 210, the method comprising: procuring coconut water 210 that has been extracted from a coconut 202 in a manner that prevented oxygen from contacting the coconut water 210 during extraction from the coconut 202; blending at least a portion of the coconut water 210 with ingredients to form a beverage product 402A or a beauty care product 402B; and distributing the beverage product 402A or the beauty care product 402B to consumers. The method begins in block 5002.

In block 5002 coconut water 210 is procured. The method moves to block 5004.

In block 5004 at least a portion of the coconut water 210 is blended with ingredients to form a beverage product 402A or a beauty card product. The method moves to block 5006.

In block 5006 the beverage product 402A or the beauty care product 402B is distributed to consumers. The method is exited.

Referring to FIG. 9 there is illustrated examples of exemplary embodiments of a method of distributing products 402 which comprise coconut water 210. Such exemplary embodiments can be selectively utilized with the methods of the present invention.

In block 5008 the coconut water 210 is extracted by way of injecting an inert gas 212 into the coconut 202.

In block 5010 the coconut water 210 is collected and utilized in a manner which minimizes carbon emissions.

In block 5012 the coconut 202 is placed in a chamber 126. The method moves to block 5014.

In block 5014 oxygen is removed or evacuated from the chamber 126. The method moves to block 5016.

In block 5016 the coconut water 210 is transferred through an egress port 114 into an oxygen free collection vessel 116.

In bock 5018 the coconut 202 shell is breeched to release the coconut water 210.

In block 5020 the beverage product 402A or beauty care product 402B is packaged in packaging material which comprises a barrier property that abates oxygen transfer. In an exemplary embodiment such packaging material can be aluminum, glass, treated polyethylene terephtha (PET) plastic, coated paper packaging, or other packaging material, as may be required and or desired in a particular embodiment.

In block 5022 the shelf life of at least the coconut water 210 is extended by distributing the product 402 through a refrigerated supply chain.

In block 5024 a macerator 106 macerates the coconut 202 to form a composting material 206.

Figure 10:
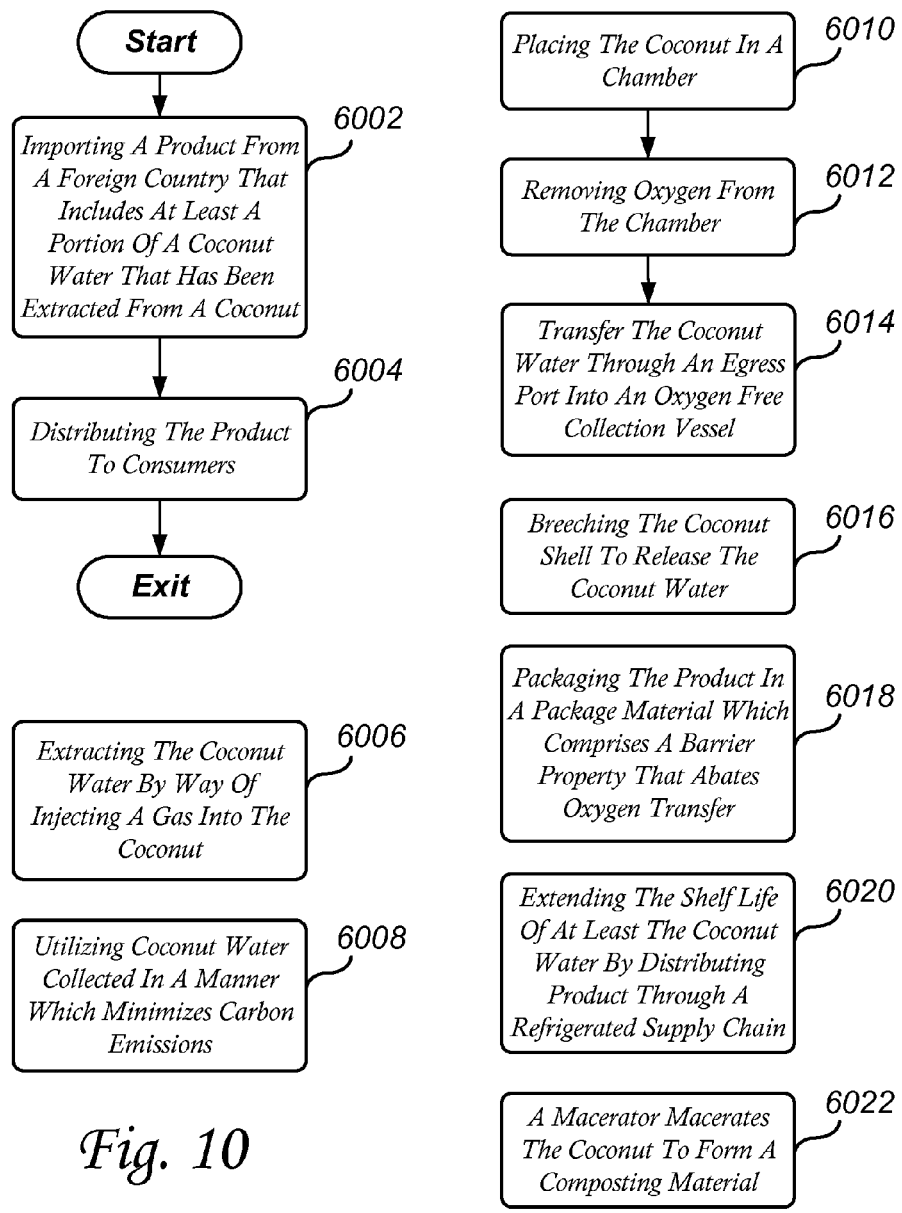

Referring to FIG. 10 there is illustrated one example of a method of distributing products 402 which comprise coconut water 210. Since the present invention prevents oxygen from contacting the coconut water 210 during extraction and subsequent storage, which better preserves the flavor, color or clarity, nutritional or nutrient value, and or other attributes of the coconut water 210, this in part enables the present invention to utilize the system 100 to extract coconut water 210 at the grove 306 instead of shipping coconuts 202 to remote processing locations. Another advantage of the present invention is that since the coconut water 210 is extracted and stored in an ideal oxygen free manner and environment the coconut water 210 can be shipped globally and delivering superior consumer benefits of flavor, color or clarity, and nutritional or nutrient value, as well as other consumer benefits. As such, the present invention, in an exemplary embodiment, provides for a method of distributing products 402 which comprises coconut water 210. For disclosure purposes a beverage product 402A, beauty care product 402B, bulk shipping container product 402C comprising coconut water 210, and or other products 402D can be referred to as product 402.

A world map 302 illustrates how the present invention can be practiced throughout the world as a system and method for preventing oxygen from contacting the coconut water 210 during extraction from a coconut 202. Furthermore, the world map 302 illustrates how, the novel system and method of extracting and storing the coconut water 210 in an oxygen free manner and collection vessel better preserves the flavor, color or clarity, nutritional or nutrient benefits, and or other attributes of the coconut water 210; thus allowing groves 306 extracted coconut water 210 to be distributed worldwide in a grove-fresh state. In this regard, the groves 306 harvested coconut water 210 can be distributed worldwide in a grove-fresh state, faster, more efficiently, and at less cost, while retaining a superior flavor, color or clarity, nutritional or nutrient benefits, and or other attributes of the coconut water 210. Thus a distribution system and method can distribute the coconut water 210 to foreign countries around the world; providing a worldwide source of superior quality coconut water 210 having many consumer benefits.

In another exemplary embodiment, the present invention teaches a method of distributing products 402 which comprises a coconut water 210, the method comprising: importing a product 402 from a foreign country that includes at least a portion of the coconut water 210 that has been extracted from a coconut 202 in a manner that prevented oxygen from contacting the coconut water 210 during extraction from the coconut 202; and distributing the product 402 to consumers. The method begins in block 6002.

In block 6002 a product 402 from a foreign country is imported, the product 402 including at least a portion of coconut water 210 that has been extracted from a coconut 202 in accordance with the systems and method of the present invention. The method moves to block 6004.

In block 6004 the product is distributed to consumers. The method is then exited.

Referring to FIG. 10 there is illustrated examples of exemplary embodiments of a method of distributing products 402 which comprise coconut water 210. Such exemplary embodiments can be selectively utilized with the methods of the present invention.

In block 6006 the coconut water 210 is extracted by way of injecting an inert gas 212 into the coconut 202.

In block 6008 the coconut water 210 is collected and utilized in a manner which minimizes carbon emissions.

In block 6010 the coconut 202 is placed in a chamber 126. The method moves to block 6012.

In block 6012 oxygen is removed or evacuated from the chamber 126. The method moves to block 6014.

In block 6014 the coconut water 210 is transferred through an egress port 114 into an oxygen free collection vessel 116.

In bock 6016 the coconut 202 shell is breeched to release the coconut water 210.

In block 6018 the product is packaged in packaging material which comprises a barrier property that abates oxygen transfer. In an exemplary embodiment such packaging material can be aluminum, glass, treated polyethylene terephtha (PET) plastic, coated paper packaging, or other packaging material, as may be required and or desired in a particular embodiment.

In block 6020 the shelf life of at least the coconut water 210 is extended by distributing the product 402 through a refrigerated supply chain.

In block 6022 a macerator 106 macerates the coconut 202 to form a composting material 206.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of distributing products which comprise a coconut water, the method comprising:
   procuring a coconut water that has been extracted from a coconut in a manner that prevented oxygen from contacting the coconut water and initiating irreversible oxidation reactions that cause rapid degradation of consumer benefit attributes associated with the coconut water by injecting a pressurized gas into the coconut, the pressurized gas preventing oxygen from entering the coconut and forces the coconut water to egress the coconut, by way of an egress port, into an oxygen free collection vessel which comprises the pressurized gas and is operationally coupled with the egress port, the oxygen free collection vessel maintaining the coconut water in a manner which prevents initiation of irreversible oxidation reaction degradation, the pressurized gas being either nitrogen, inert, or noble gas;
   manufacturing a product that includes at least a portion of the coconut water, wherein the coconut water absent contact with oxygen through harvest, processing, and transport remains mostly absent of irreversible oxidation reaction degradation at least until manufacture of the product; and
   distributing the product to consumers.

2. The method in accordance with claim 1, the step of procuring further comprising:
   placing the coconut in a chamber; and
   removing the oxygen from the chamber, creating an oxygen free environment around the coconut.

3. The system in accordance with claim 1, wherein the step of distributing further comprising:
   utilizing coconut water collected in a manner which minimizes carbon emissions impact associated with processing the coconut by extracting the coconut water with a mobile processing system locatable proximate the coconut grove in lieu of transporting the coconut to a remote processing location, wherein transporting the coconut can create wasteful carbon emissions not useful to the activity of extracting the coconut water.

4. The method in accordance with claim 1, further comprising:
   breeching the coconut shell to release the coconut water.

5. The method in accordance with claim 1, further comprising:
   packaging the product in a package material which comprises a barrier property that abates oxygen transfer from the external environment to the product.

6. The method in accordance with claim 1, the step of distributing further comprising:
   extending the consumer benefit of at least the coconut water by distributing the product through a refrigerated supply chain.

7. The method in accordance with claim 1, wherein the product is either a beverage product or a beauty care product.

8. A method of distributing products which comprise a coconut water, the method comprising:
   procuring a coconut water that has been extracted from a coconut in a manner that prevented oxygen from contacting the coconut water and initiating irreversible oxidation reactions that cause rapid degradation of consumer benefit attributes associated with the coconut water by injecting a pressurized gas into the coconut, the pressurized gas preventing oxygen from entering the coconut and forces the coconut water to egress the coconut, by way of an egress port, into an oxygen free collection vessel which comprises the pressurized gas and is operationally coupled with the egress port, the oxygen free collection vessel maintaining the coconut water in a manner which prevents initiation of irreversible oxidation reaction degradation, the pressurized gas being either nitrogen, inert, or noble gas;
   blending at least a portion of the coconut water with ingredients to form a beverage product or a beauty care product, wherein the coconut water absent contact with oxygen through harvest, processing, and transport remains mostly absent of irreversible oxidation reaction degradation at least until manufacture of the beverage product or the beauty care product; and
   distributing the beverage product or the beauty care product to consumers.

9. The method in accordance with claim 8, the step of procuring further comprising:
   placing the coconut in a chamber; and
   removing the oxygen from the chamber, creating an oxygen free environment around the coconut.

10. The method in accordance with claim 8, further comprising:
    packaging the product in a package material which comprises a barrier property that abates oxygen transfer from the external environment to the beverage product or a beauty care product.

11. The method in accordance with claim 8, the step of distributing further comprising:
    extending the consumer benefit of at least the coconut water by distributing the beverage product or the beauty care product through a refrigerated supply chain.

12. A method of distributing products which comprise a coconut water, the method comprising:
    importing a product from a foreign country that includes at least a portion of a coconut water that has been extracted from a coconut in a manner that prevented oxygen from contacting the coconut water and initiating irreversible oxidation reactions that cause rapid degradation of consumer benefit attributes associated with the coconut water by injecting a pressurized gas into the coconut, the pressurized gas preventing oxygen from entering the coconut and forces the coconut water to egress the coconut, by way of an egress port, into an oxygen free collection vessel which comprises the pressurized gas and is operationally coupled with the egress port, the oxygen free collection vessel maintaining the coconut water in a manner which prevents initiation of irreversible oxidation reaction degradation, the pressurized gas being either nitrogen, inert, or noble gas; and distributing the product to consumers, wherein the coconut water absent contact with oxygen through harvest, processing, and transport remains mostly absent of irreversible oxidation reaction degradation at least until manufacture of the product.

13. The method in accordance with claim 12, the step of importing further comprising:

placing the coconut in a chamber; and removing the oxygen from the chamber, creating an oxygen free environment around the coconut.

14. The system in accordance with claim 12, wherein the step of importing further comprising:

utilizing coconut water collected in a manner which minimizes carbon emissions impact associated with processing the coconut by extracting the coconut water with a mobile processing system locatable proximate the coconut grove in lieu of transporting the coconut to a remote processing location, wherein transporting the coconut can create wasteful carbon emissions not useful to the activity of extracting the coconut water.

15. The method in accordance with claim 12, further comprising:

packaging the product in a package material which comprises a bather property that abates oxygen transfer from the external environment to the beverage product.

16. The method in accordance with claim 12, further comprising:

blending at least a portion of the product with ingredients to form a beverage product or a beauty care product.

17. The method in accordance with claim 12, the step of distributing further comprising:

extending the consumer benefit of at least the coconut water by distributing the product through a refrigerated supply chain.

\* \* \* \* \*